(12) United States Patent
Cordaro et al.

(10) Patent No.: US 9,019,096 B2
(45) Date of Patent: Apr. 28, 2015

(54) RAPID DEPLOYABLE GLOBAL SENSING HAZARD ALERT SYSTEM

(71) Applicant: Savannah River Nuclear Solutions, LLC, Aiken, SC (US)

(72) Inventors: Joseph V. Cordaro, Martinez, GA (US); Steven L. Tibrea, Aiken, SC (US); Davis J. Shull, Batesburg, SC (US); Jerry T. Coleman, Augusta, GA (US); James M. Shuler, Germantown, MD (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 93 days.

(21) Appl. No.: 14/037,949

(22) Filed: Sep. 26, 2013

(65) Prior Publication Data

US 2015/0084766 A1   Mar. 26, 2015

(51) Int. Cl.
G08B 19/00 (2006.01)
G08B 21/10 (2006.01)
G08B 25/10 (2006.01)
H04W 28/04 (2009.01)
H04W 84/12 (2009.01)

(52) U.S. Cl.
CPC ............... *G08B 21/10* (2013.01); *G08B 25/10* (2013.01); *H04W 28/04* (2013.01); *H04W 84/12* (2013.01)

(58) Field of Classification Search
CPC ..... H04W 28/04; H04W 84/12; H04W 84/18; H04W 88/021; H04W 72/042; H04W 72/0426
USPC ............ 340/521; 370/338, 310, 407; 455/521
See application file for complete search history.

(56) References Cited

U.S. PATENT DOCUMENTS

| | | | |
|---|---|---|---|
| 5,414,432 | A | 5/1995 | Penny, Jr. et al. |
| 5,815,538 | A | 9/1998 | Grell et al. |
| 6,031,454 | A | 2/2000 | Lovejoy et al. |
| 6,118,382 | A | 9/2000 | Hibbs et al. |
| 7,109,859 | B2 | 9/2006 | Peeters |

(Continued)

FOREIGN PATENT DOCUMENTS

| | | |
|---|---|---|
| DE | 4005913 | 8/1991 |
| WO | WO 2008/085511 | 7/2008 |

OTHER PUBLICATIONS

Aravind.V. S., Nuclear Battery with a Life Span of 20+ Years, dated Nov. 12, 2012.
Author Unknown, "Finding the Way Inside", *The Economist Technology Quarterly*, Dec. 1, 2012, 2 pages.
Bender, III, et al., "Development, Operation, and Results from the Texas Automated Buoy System", *Gulf of Mexico Science*, 2007 (1), pp. 33-60.

(Continued)

*Primary Examiner* — John A Tweel, Jr.
(74) *Attorney, Agent, or Firm* — Dority & Manning, P.A.

(57) ABSTRACT

A rapid deployable global sensing hazard alert system and associated methods of operation are provided. An exemplary system includes a central command, a wireless backhaul network, and a remote monitoring unit. The remote monitoring unit can include a positioning system configured to determine a position of the remote monitoring unit based on one or more signals received from one or more satellites located in Low Earth Orbit. The wireless backhaul network can provide bidirectional communication capability independent of cellular telecommunication networks and the Internet. An exemplary method includes instructing at least one of a plurality of remote monitoring units to provide an alert based at least in part on a location of a hazard and a plurality of positions respectively associated with the plurality of remote monitoring units.

20 Claims, 8 Drawing Sheets

(56) References Cited

U.S. PATENT DOCUMENTS

| | | | |
|---|---|---|---|
| 7,228,210 | B2 | 6/2007 | Davis et al. |
| 7,233,781 | B2 | 6/2007 | Hunter et al. |
| 7,366,120 | B2 * | 4/2008 | Handforth et al. ............ 370/310 |
| 7,958,041 | B2 * | 6/2011 | Stanforth et al. ................ 705/37 |
| 7,969,307 | B2 | 6/2011 | Peeters |
| 8,213,977 | B2 * | 7/2012 | Klein et al. .................... 455/519 |
| 8,229,368 | B1 * | 7/2012 | Immendorf et al. ............. 455/78 |
| 8,289,152 | B1 | 10/2012 | Greenberger |
| 8,315,237 | B2 | 11/2012 | Berger et al. |
| 8,446,274 | B1 | 5/2013 | Crook |
| 8,451,120 | B2 | 5/2013 | Johnson, Jr. et al. |
| 2007/0077945 | A1 | 4/2007 | Sheynblat |
| 2008/0117094 | A1 | 5/2008 | Lindoff et al. |
| 2012/0188901 | A1 * | 7/2012 | Struhsaker et al. ........... 370/252 |
| 2013/0010777 | A1 * | 1/2013 | Periyalwar et al. ........... 370/338 |

OTHER PUBLICATIONS

Onramp Wireless, Generic Devices for M2M, product data sheet, dated Sep. 25, 2013, 3 pages.

"The On-Ramp Total Reach Network is the only wireless network purpose-built to power the M2M revolution," On-Ramp Wireless, Web. Sep. 25, 2013, 4 pages.

Cordaro et al "Ultra secure high reliability wireless radiation monitoring system" Instrumentation & Measurement Magazine, 14, 6, Dec. 2011, 2 pages.

Cordaro et al., "Tagging, Tracking and Locating without GPS", Office of Scientific and Technical Information, 2012, 11 pages.

SRNL-STI-2013-00342 Revision 0—"Applications of Current Technology for Continuous Monitoring of Fuel Spent", Savannah River National Laboratory, Jun. 9, 2013, 9 pages.

\* cited by examiner

RAPID DEPLOYABLE GLOBAL SENSING HAZARD ALERT SYSTEM

FEDERAL RESEARCH STATEMENT

This invention was made with Government support under Contract No. DE-AC09-085R22470, awarded by the U.S. Department of Energy. The Government has certain rights in the invention.

FIELD OF THE INVENTION

The present disclosure is generally directed to mobile monitoring systems. More particularly, the present disclosure is directed to a rapid deployable global sensing hazard alert system.

BACKGROUND OF THE INVENTION

Recent events have reinforced the need for a rapidly deployable hazard sensing and alert system that combines and provides advanced communication, sensing, and alert features. For example, the attacks of Sep. 11, 2001 and the Fukushima Daiichi nuclear disaster have illustrated certain deficiencies associated with existing technology.

In particular, one problem associated with certain existing hazard detection and alert systems is the struggle to provide accurate geo-location or other communication with remote units within a difficult signal propagation environment. Unfortunately, such difficult signal propagation environments are typically the places in which hazard sensing and alert systems are most valuable or desirable. For example, certain communication systems can fail to provide accurate geo-location or other communication within a large industrial plant, a mine, a heavily wooded area, an urban area with many tall buildings, in a ravine or canyon, underneath a large amount of rubble, or other difficult signal propagation environments.

Another problem associated with certain existing hazard detection and alert systems is a reliance upon existing communications infrastructure. For example, such systems may use WiFi hot spots, cellular telecommunication towers, or other existing communications infrastructure. However, in the event of a large scale natural disaster or other hazard, such existing communications infrastructure can be rendered locally or globally inoperable or otherwise unreliable due to destruction, overloading, or other potential problems including sabotage or other nefarious actions.

Furthermore, it has been shown that certain GPS-based systems can be cheaply and easily spoofed into providing a false location report. For example, by broadcasting a signal that is slightly more powerful than the actual GPS satellite and structured to match a normal GPS broadcast, a GPS receiver can be spoofed into reporting erroneous location information. Thus, if such GPS-based systems are used without further safeguards in the tracking of high value material such as nuclear or other hazardous material, the consequences of a spoofing attack could be disastrous, as the vehicles or storage containers being tracked could be thousands of miles from their actual location or expected route.

Therefore, rapid deployable global sensing hazard alert systems that combine and provide advanced communication, sensing, and alert features are desirable.

BRIEF DESCRIPTION OF THE INVENTION

Aspects and advantages of the invention will be set forth in part in the following description, or may be apparent from the description, or may be learned through practice of the invention.

One aspect of the present disclosure is directed to a remote monitoring unit for use in a hazard detection and alert system. The remote monitoring unit includes a communications module configured for bidirectional communication with a central command via a wireless backhaul network. The remote monitoring unit further includes a positioning system configured to determine a position of the remote monitoring unit based on one or more signals received from one or more satellites located in Low Earth Orbit.

Another aspect of the present disclosure is directed to a hazard detection and alert system. The hazard detection and alert system includes a central command, a wireless backhaul network, and a remote monitoring unit. The remote monitoring unit includes a communications module configured for bidirectional communication with the central command via the wireless backhaul network. The remote monitoring unit further includes a positioning system. The wireless backhaul network provides at least a portion of the bidirectional communication capability independent of cellular telecommunication networks and the Internet.

Another aspect of the present disclosure is directed to a method for operating a hazard detection and alert system. The method includes receiving, via a wireless backhaul network, sensor data from a plurality of remote monitoring units. The method includes receiving, via the wireless backhaul network, positioning data describing a plurality of positions respectively associated with the plurality of remote monitoring units. The method includes determining the existence and location of a hazard. The method includes instructing at least one of the plurality of remote monitoring units to provide an alert based at least in part on the location of the hazard and the plurality of positions. The alert indicates a proximity between the location of the hazard and the position of the remote monitoring unit providing the alert.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
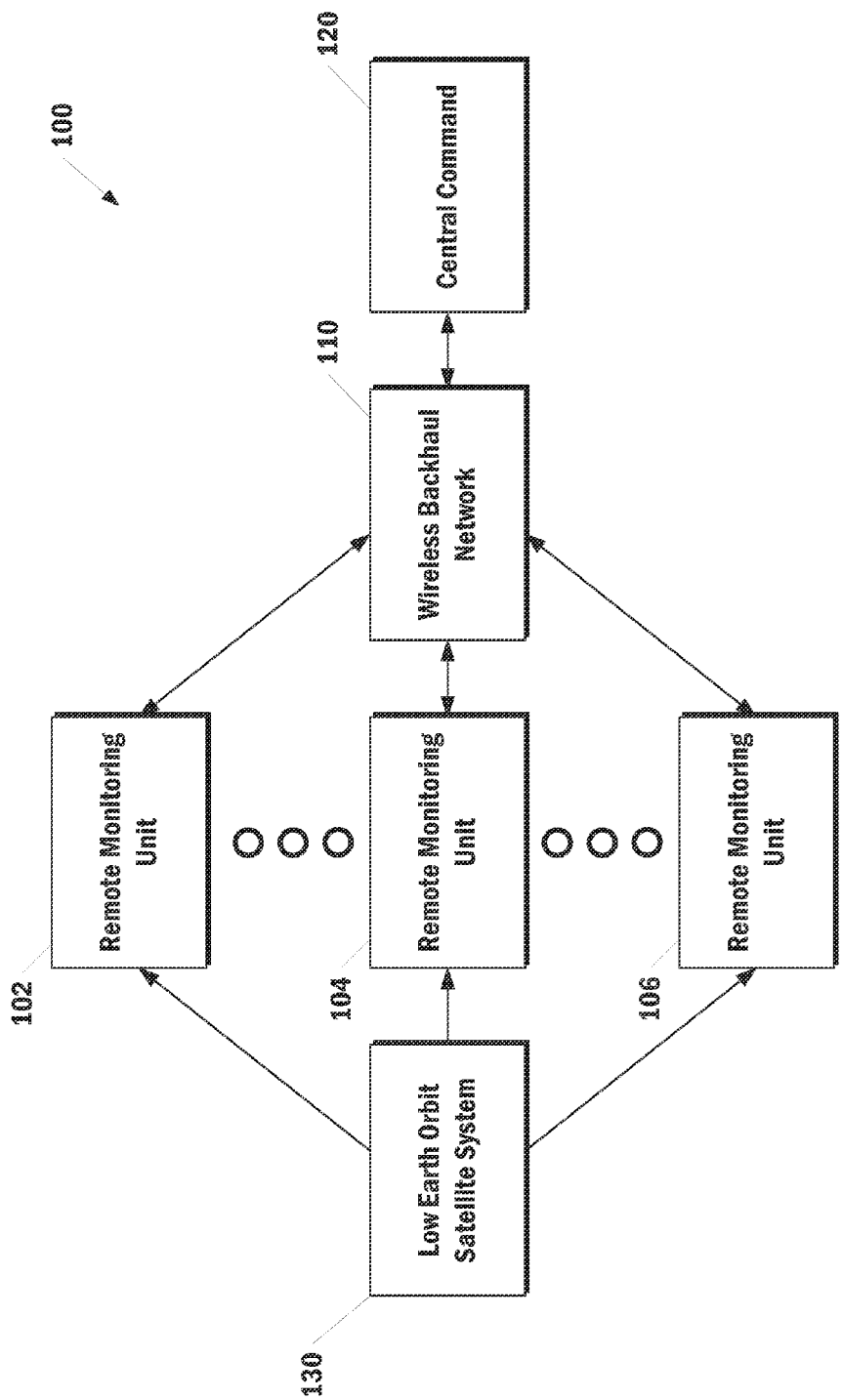
FIG. 1 depicts an exemplary hazard detection and alert system according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 depicts an exemplary hazard detection and alert system 100 according to an exemplary embodiment of the present disclosure. System 100 can include three major components: a plurality remote monitoring units 102, 104, and 106, a wireless backhaul network 110, and a central command 120. Although three remote monitoring units are depicted in FIG. 1, any number of remote monitoring units can be included in system 100.

Remote monitoring units 102, 104, and 106 can be portable, mobile, or otherwise wearable by a user. As an example, remote monitoring units 102, 104, and 106 can be deployed into a hazardous location from an airship, land vehicle, or boat so as to provide a remote sensor array. As another example, remote monitoring units 102, 104, and 106 can be worn by first responders entering a hazardous area so as to provide a real time personnel tracking and alert system. As yet another example, remote monitoring units 102, 104, and 106 can be co-located with a hazardous material, such as a container of nuclear material, so as to provide hazard tracking and event detection.

Remote monitoring units 102, 104, and 106 can include or connect to a variety of environmental sensors, including a miniature low-power nuclear radiation sensor or a gas leak sensor. Remote monitoring units 102, 104, and 106 can respectively determine their respective locations based upon signals received from a satellite system 130 that is located in Low Earth Orbit.

Remote monitoring units 102, 104, and 106 can report their locations, along with other data such as sensor data, to central command 120 via wireless backhaul network 110. Thus, system 100 can be used to track or monitor environmental conditions and personnel in real time anywhere on the Earth, including indoor locations, remote outdoor locations, or other difficult signal propagation environments.

In addition, wireless backhaul network 110 can provide for bidirectional communications between remote monitoring units 102, 104, and 106 and central command 120, at least a portion of which can be independent from existing infrastructure such as cellular telecommunications infrastructure or the Internet. Using such bidirectional communications capability, the central command 120 can identify particular remote monitoring units exposed to a hazard and downlink alert instructions to such remote monitoring units. Thus, hazard detection and alert system 100 can provide advanced communications, sensing, and alert technologies.

Further, although FIG. 1 depicts remote monitoring units 102, 104, and 106 determining their respective positions based on communication with satellite system 130 located in Low Earth Orbit, such depiction is exemplary in nature and not intended to limit the present disclosure. In particular, in some implementations, remote monitoring units 102, 104, and 106 can include a plurality of positioning systems using various positioning techniques, including determining position based on signals received from satellite systems located outside of Low Earth Orbit, such as, for example, the GPS satellite system.

Figure 2:
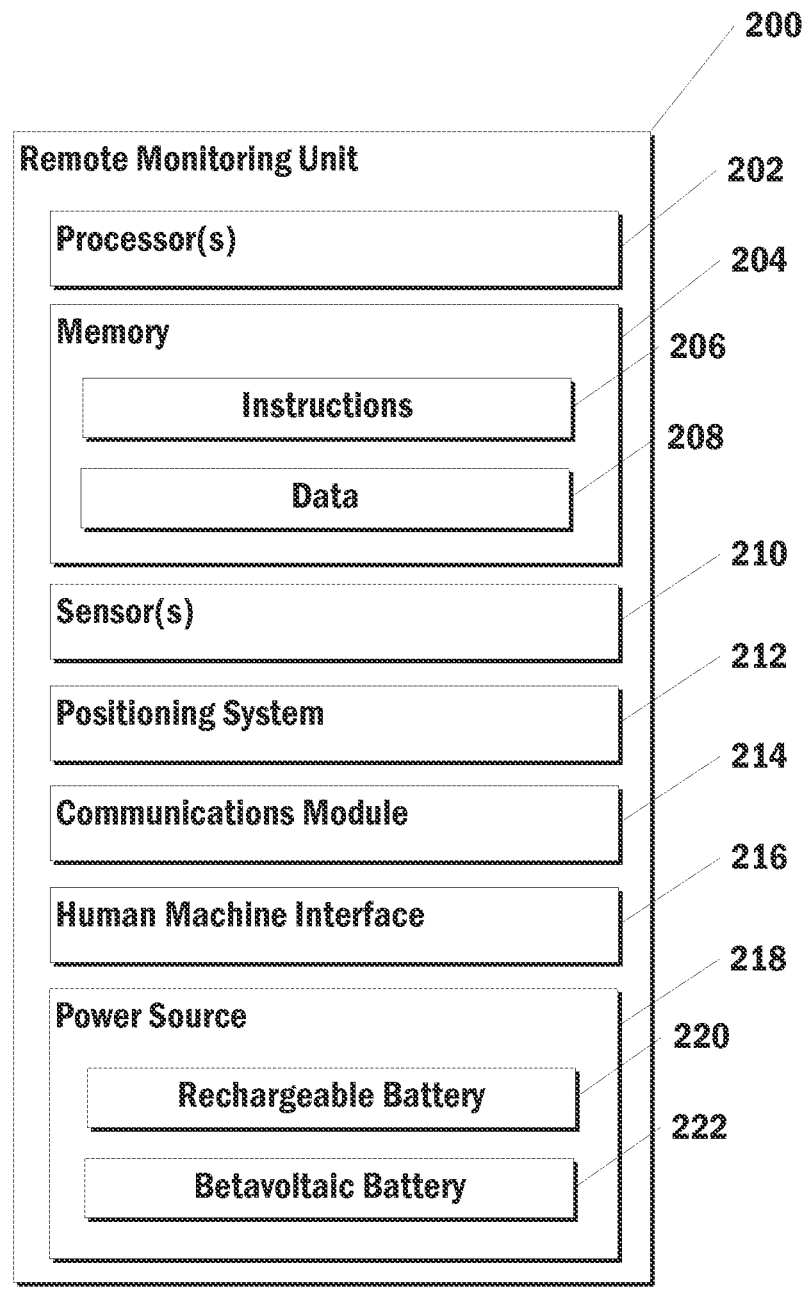
FIG. 2 depicts an exemplary remote monitoring unit according to an exemplary embodiment of the present disclosure.

FIG. 2 depicts an exemplary remote monitoring unit 200 according to an exemplary embodiment of the present disclosure. Remote monitoring unit 200 can be used in any suitable hazard detection and alert system, including, for example, system 100 of FIG. 1.

Remote monitoring unit 200 can include one or more processors 202 and a memory 204. The processor(s) 202 can be any suitable processing device, such as a microprocessor, microcontroller, integrated circuit, or other suitable processing device, including a combination of discrete analog and/or digital logic circuitry (such as switches, amplifiers, integrators, comparators, flip-flops, AND gates, and the like) to perform control functionality.

The memory 204 can include any suitable computing system or media, including, but not limited to, non-transitory computer-readable media, RAM, ROM, hard drives, flash drives, or other memory devices. The memory 204 can store information accessible by processor(s) 202, including instructions 206 that can be executed by processor(s) 202. The instructions 206 can be any set of instructions that when executed by the processor(s) 202, cause the processor(s) 202 to provide desired functionality. For example, instructions 206 can include instructions for performing method (500) of FIGS. 5A and 5B. Memory 204 can further store data 208. Data 208 can be any form of data, including data received from one or more sensors 210 and stored for later transmission.

Remote monitoring unit 200 can include or can be operably connected to one or more sensors 210. Sensors 210 can be any sensor that provides useful information for a hazard detection and alert system. As examples, sensors 210 can include a radiation sensor, a chlorine gas sensor, a hydrogen sulfide gas sensor, a temperature sensor, a wind direction and strength sensor, a biosensor, an acoustic sensor, an environmental sensor, an optical sensor, a proximity sensor, an orientation sensor, a chemical sensor, or any other suitable sensor. An output from sensors 210 can be received and processed by processor(s) 202 or stored in data 208.

In one embodiment, sensor 210 can be a miniature, low-power proportional counter for radiation detection. The proportional counter can operate below nine volts and still detect radiation using the avalanche effect used on large high voltage standard proportional counters. The proportional counter can include an array of carbon Nano tubes.

Remote monitoring unit 200 can further include a positioning system 212 that can be used to identify a current position of remote monitoring unit 200. In particular, according to an aspect of the present disclosure, positioning system 212 can be configured to determine the current position of remote monitoring unit 200 based on one or more signals received from one or more satellites located in Low Earth Orbit. Because satellites located in Low Earth Orbit are much closer to the surface of the Earth than satellites that are located in Medium Earth Orbit (such as GPS), satellites in Low Earth Orbit exhibit up to 1000 times the power level on Earth (i.e. 30 dB gain).

Such increased signal reception power can allow positioning system 212 to accurately or successfully receive signals deep inside buildings, in heavily wooded areas, on oil and gas drilling platforms, or other difficult signal reception areas where GPS receivers typically struggle to properly operate.

As an example, positioning system 212 can include a satellite receiver that can receive and process signals from satellites included in the Iridium® satellite constellation, maintained by Iridium Communications Inc., located at 1750 Tysons Boulevard, Suite 1400 McLean, Va. 22102. The Iridium® satellite constellation is located in Low Earth Orbit.

Another benefit achieved through the use of a positioning system 212 that receives and processes signals from satellites included in the Iridium® satellite constellation is that Iridium® satellite signals are more difficult to spoof than GPS signals. For example, the higher power of such signals makes it more difficult for spoofing signals to overwhelm the true satellite signals.

Furthermore, each of the 66 satellites currently included in the Iridium® satellite constellation generate 48 spot beams, each of which are about 400 kilometers in diameter. In addition to transmission of positioning signals, each of such spot beams transmits a constantly changing unique random number. Only receivers under a spot beam can pick up the signal and therefore the random number. According to an aspect of the present disclosure, this sequence of random numbers can be used to validate the positions reported by remote monitoring unit 200.

In particular, remote monitoring unit 200 can report the random numbers received by positioning system 212 back to the central command along with the position data. The reported numbers can be compared against random numbers reported by other devices that should be under the same spot beam to validate the position provided by remote monitoring unit 200. For example, such other devices can include other remote monitoring units, a backhaul device or access point included in the wireless backhaul network, or the central command itself. Alternatively, the central command can communicate the random numbers received by itself or other devices to the remote monitoring unit 200 and the remote monitoring unit 200 can perform the validation locally. In such fashion, spoofing concerns can be greatly reduced.

Positioning system 212 can also include any other device or circuitry for monitoring the position of the remote monitoring unit 200. For example, the positioning system 212 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

As another example, in some implementations, positioning system 212 can include both a first and second satellite receiver system. The first satellite receiver system can assist in determining the position of remote monitoring unit 200 based on signals received from satellites located in Low Earth Orbit. The second satellite receiver system can assist in determining the position of remote monitoring unit 200 based on signals received from GPS satellites.

In some implementations, processor(s) 202 are embedded in positioning system 212. Thus, in such implementations, the output of sensor 210 is provided to positioning system 212 via an analog input of positioning system 212. Positioning system 212 can further include a serial output that transmits or provides geo-location information, such as a current position, or other information. The serial output can be coupled to a communications module 214.

Remote monitoring unit 200 can further include communications module 214. Communications module 214 can be configured to provide bidirectional communications capability between remote monitoring unit 200 and a wireless backhaul network according to any known communications techniques or technologies.

As an example, communications module 214 can include an RF modem and RF transceiver configured to communicate with an access point of the wireless backhaul network. For example, the access point can be a Total Reach Access Point manufactured by On-Ramp Wireless, Inc., located at 10920 Via Frontera, Suite 200 San Diego, Calif. 92127.

In particular, communications module 214 can communicate with the access point using Random Phase Multiple Access™ in the 2.4 GHz band, providing coverage up to 17 miles away and coexisting in the presence or absence of 802.15.4, 802.11, and cell tower signals. Thus, the bidirectional communications between communications module 214 and the wireless backhaul network can penetrate deep into buildings, inside well shielded containers, across large distances, or other difficult signal propagation environments. However, other communications techniques, protocols, and frequency bands can be used as well.

Furthermore, communications between remote monitoring unit 200 and a central command can use elliptic curve cryptography for digital signatures or key exchanges. In addition, Advanced Encryption Standard block encryption can be used for data transfers.

Remote monitoring unit 200 can further include a human machine interface 216. Interface 216 can include any number of components, including a display, a touch-sensitive screen, a speaker, vibration generation device, indicator lights, user input devices such as a keyboard or input buttons, touch pad, or any other desirable components, including any suitable components for providing an alert or other alarm to a user.

As an example, in one implementation, human machine interface 216 can provide a continuous and variable beeping alarm to indicate whether remote monitoring unit 200 is moving closer to or farther away from the location of a hazardous condition, thereby directing the user to a safe location.

Remote monitoring unit 200 can include a power source 218. For example, power source 218 can include both a rechargeable battery 220 and a betavoltaic battery 222. The betavoltaic battery 222 can be configured to provide a trickle charge to rechargeable battery 220. As an example, rechargeable battery 220 can be a lithium battery and betavoltaic battery 222 can be a tritium battery, providing for an expected powered lifetime of twenty years or greater. For example, betavoltaic battery 222 can be a NanoTritium™ betavoltaic power source manufactured by City Labs, Inc., located at 301 Civic Court, Homestead, Fla. 33030. However, other battery configurations or power sources can be used as well.

Figure 3:
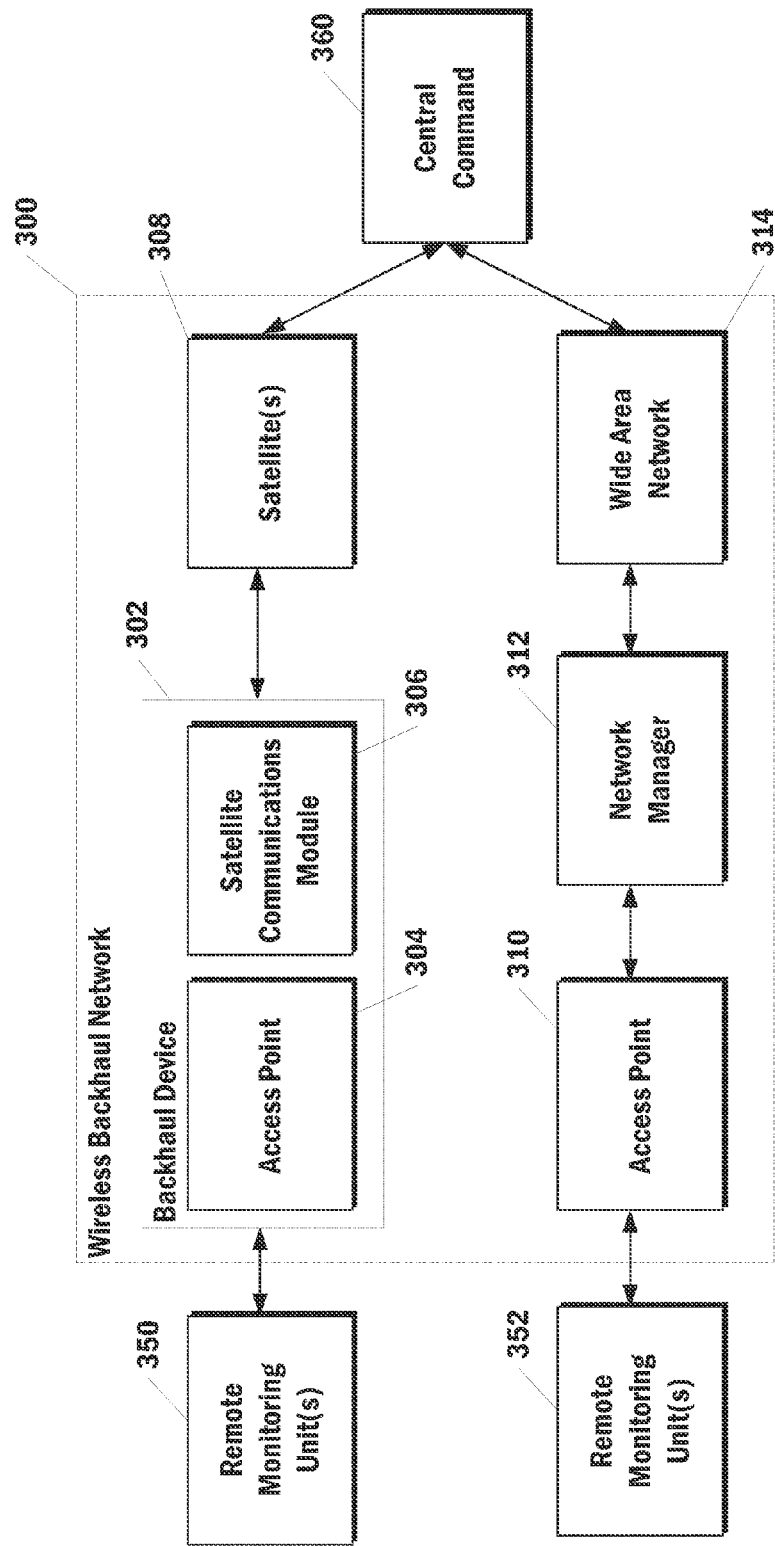
FIG. 3 depicts an exemplary wireless backhaul network according to an exemplary embodiment of the present disclosure.

FIG. 3 depicts an exemplary wireless backhaul network 300 according to an exemplary embodiment of the present disclosure. Wireless backhaul network 300 can be used in any suitable hazard detection and alert system, including, for example, system 100 of FIG. 1. Wireless backhaul network 300 can provide bidirectional communications capability between a plurality of remote monitoring units 350 and 352 and a central command 360.

FIG. 3 depicts two alternate, exemplary pathways provided by wireless backhaul network 300. In a first exemplary communication pathway, a plurality of remote monitoring units 350 can communicate with a backhaul device 302. Backhaul device 302 can include an access point 304 and a satellite communications module 306.

Access point 304 can communicate with remote monitoring units 350 using an RF modem and RF transceiver. As an example, access point 304 can be a Total Reach Access Point manufactured by On-Ramp Wireless, Inc. In particular, access point 304 can communicate with remote monitoring units 350 using Random Phase Multiple Access™ in the 2.4 GHz band, providing coverage up to 17 miles away and coexisting in the presence or absence of 802.15.4, 802.11, and cell tower signals.

Furthermore, access point 304 can have a receiver sensitivity of −145 dBm. Thus, the bidirectional communications between communications module 214 and the wireless backhaul network can penetrate deep into buildings, inside well shielded containers, across large distances, or other difficult signal propagation environments. Therefore, one or more access points 304 surrounding a location of a hazardous event can provide robust, wide-area coverage for a plurality of remote monitoring units 350.

Satellite communications module 306 can be connected to or otherwise in communication with access point 304. Satellite communications module 306 can include any components desired for bidirectional communication via one or more satellites. For example, satellite communications module 306 can include a satellite modem and a satellite transceiver.

Satellite communications module 306 can transmit information received by access point 304 from remote monitoring units 350 to central command 360 via one or more satellites 308. As an example, satellites 308 can be included in the Iridium® satellite constellation, which is located in Low Earth Orbit.

Thus, backhaul device 302 can communicate with remote monitoring units 350 via RF capabilities provided by access point 304 and can communicate with central command 360 via satellite communication capabilities provided by satellite communications module 306.

In a second exemplary communications pathway provided by wireless backhaul network 300, a plurality of remote monitoring units 352 can be in communication with an access point 310. Access point 310 can be similar or identical to access point 304, except, for example, that access point 310 can be a free-standing device.

Access point 310 can use its RF communication functionality to communicate with a network manager 312. Although access point 310 is shown in FIG. 3 as directly communicating with network manager 312, it will be appreciated that access point 310 and network manager 312 can be members of an RF mesh communications network so that a number of intervening communications links or points are utilized.

Network manager 312 can be an access point that performs network management functionality or can include additional processing power or intelligence relative to access point 310. For example, network manager 312 can include or be in communication with a web-accessible server.

Network manager 312 can communicate with central command 360 over a wide area network 314 (e.g. the Internet). Alternatively, a direct connection or local area network can be provided between network manager 312 and central command 360.

In general, communication between the network manager 312 and central command 360 can be carried using any type of wired and/or wireless connection, using a variety of communication protocols (e.g. TCP/IP, HTTP), encodings or formats (e.g. HTML, XML), and/or protection schemes (e.g. VPN, secure HTTP, SSL).

Thus, as shown in FIG. 3, wireless backhaul network 300 can utilize a plurality of different communications technologies to provide bidirectional communications between the plurality of remote monitoring units 350 and 352 and the central command 360. However, it should be appreciated that the pathways and technologies discussed with reference to FIG. 3 are exemplary in nature and can be rearranged and/or omitted to produce various alternative combinations or pathways.

In addition, according to an aspect of the present disclosure, wireless backhaul network 300 can provide at least a portion of the bidirectional communication capabilities between remote monitoring units 350 and 352 and the central command 360 independent of existing infrastructure such as WiFi hotspots, cellular telecommunications infrastructure, or the Internet.

Thus, as shown in FIG. 3, the primary link from the remote monitoring units 350 and 352 to the wireless backhaul network 300 will generally occur by way of RF communications with an access point 304 or 310. As access points 304 and 310 can provide an operable communications range of 17 miles or greater, their use as the primary link can allow for the remote monitoring units to be located within a hazardous zone or remote area and transmit information out to an area where existing infrastructure is more available or reliable, thereby bypassing locally unreliable infrastructure or compensating for a lack of such infrastructure.

However, if use of existing infrastructure is to be minimized or eliminated, then use of a backhaul device 302 that includes a satellite communications module 306 can extend the reach of wireless backhaul network 300 globally while minimizing or eliminating any reliance upon existing Earth-bound infrastructure.

Figure 4:
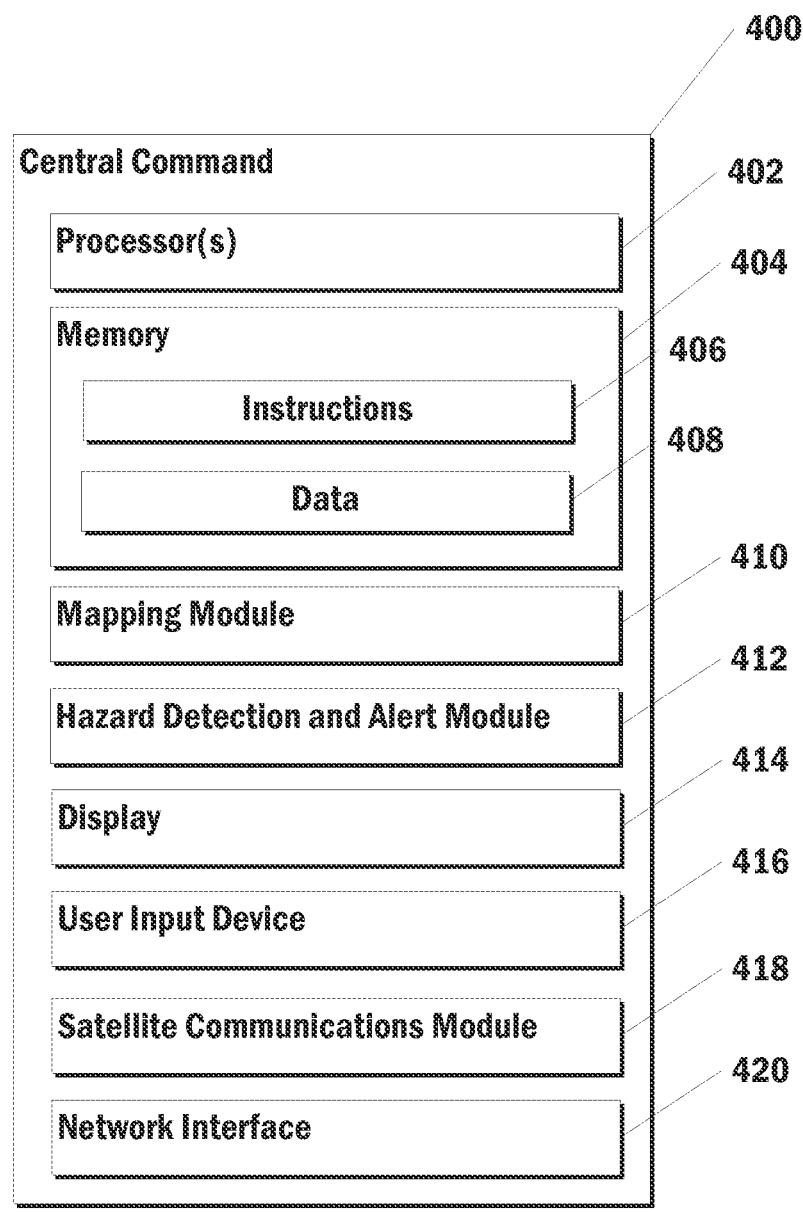
FIG. 4 depicts an exemplary central command according to an exemplary embodiment of the present disclosure.

FIG. 4 depicts an exemplary central command 400 according to an exemplary embodiment of the present disclosure. Central command 400 can be used in any suitable hazard detection and alert system, including, for example, system 100 of FIG. 1. Central command 400 can include one or more computing devices operating together in parallel or series.

Central command 400 can include one or more processors 402 and a memory 404. The processor(s) 402 can be any suitable processing device, such as a microprocessor, microcontroller, integrated circuit, or other suitable processing device, including a combination of discrete analog and/or digital logic circuitry (such as switches, amplifiers, integrators, comparators, flip-flops, AND gates, and the like) to perform control functionality.

The memory 404 can include any suitable computing system or media, including, but not limited to, non-transitory computer-readable media, RAM, ROM, hard drives, flash drives, or other memory devices. The memory 404 can store information accessible by processor(s) 402, including instructions 406 that can be executed by processor(s) 402. The instructions 406 can be any set of instructions that when executed by the processor(s) 402, cause the processor(s) 402 to provide desired functionality. For example, instructions 406 can include instructions for performing method (600) of FIG. 6. Memory 404 can further store data 408. Data 408 can be any form of data, including data received from one or more remote monitoring units or other data retrieved from an external data source over a network.

Central command 400 can further include a mapping module 410. Mapping module 410 can generate a map of a plurality of positions respectively corresponding to a plurality of remote monitoring units. Mapping module 410 can further depict sensor data received from the plurality of remote monitoring units. For example, in one implementation, mapping module 410 can synthesize received sensor data to provide a graph of a hazardous condition.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Central command 400 can further include a hazard detection and alert module 412. As an example, hazard detection and alert module 412 can synthesize or otherwise analyze received data to determine the existence and location of a hazardous condition. As another example, hazard detection and alert module 412 can determine a proximity of a position of a remote monitoring unit to the location of the hazardous condition. As yet another example, hazard detection and alert module 412 can determine a current or projected hazard exposure status for each remote monitoring unit. For example, hazard detection and alert module 412 can analyze current sensor readings and current and projected wind direction data to determine a projected hazard exposure status for each remote monitoring unit.

Central command 400 can include a display 414 such as, for example, a screen or monitor and one or more user input devices 416 such as, for example, a keyboard and mouse.

Central command 400 can further include a satellite communications module 418. Satellite communications module 418 can allow central command 400 to engage in bidirectional communications via one or more satellites, including, for example, one or more satellites located in Low Earth Orbit.

Satellite communications module 418 can include any components desired for bidirectional communication via one or more satellites. For example, satellite communications module 418 can include a satellite modem and a satellite transceiver.

Central command 400 can further include a network interface 420. Network interface 420 can include any components or configuration suitable for communication over a network, including, for example, one or more ports, transmitters, wireless cards, controllers, physical layer components, or other items for communication according to any currently known or future developed communications protocol or technology.

Figure 5A:
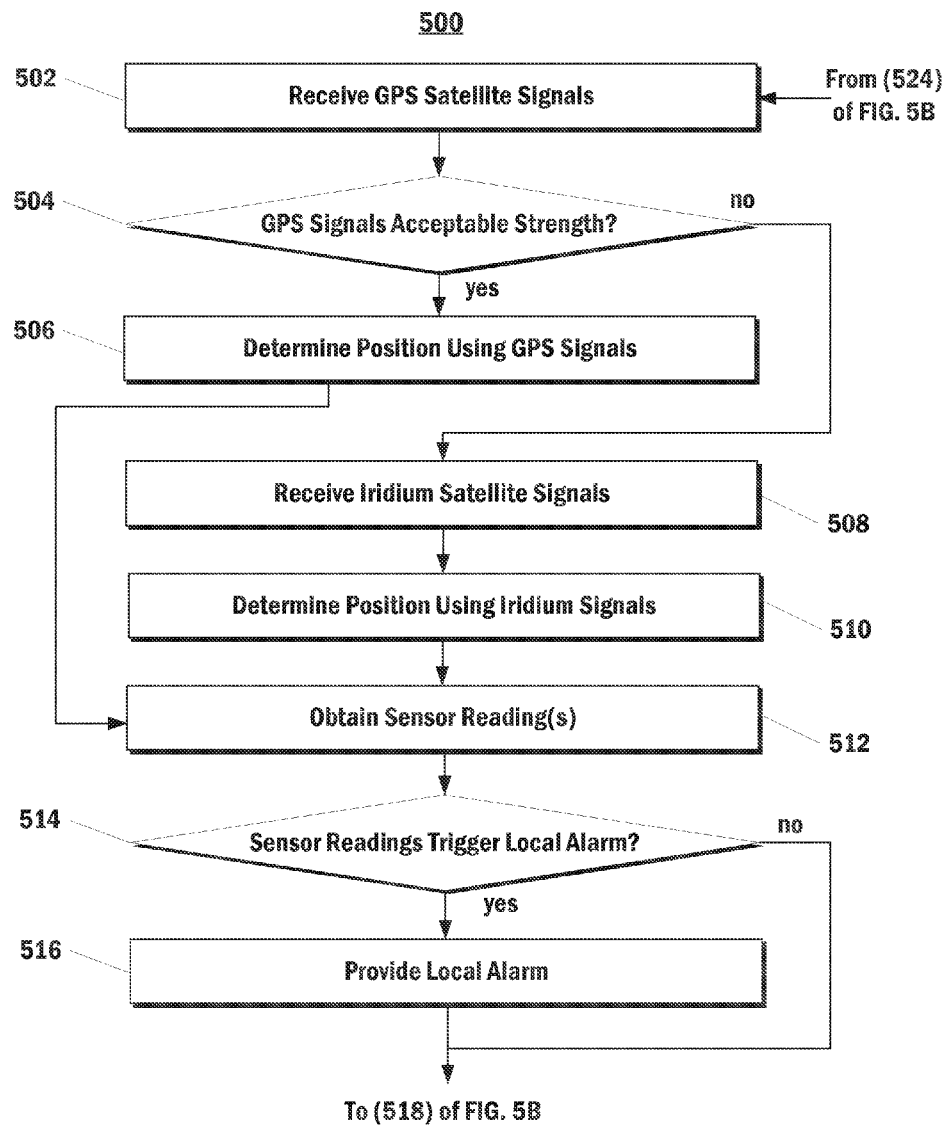
FIGS. 5A and 5B depict an exemplary method for operating a remote monitoring unit according to an exemplary embodiment of the present disclosure.
Figure 5B:
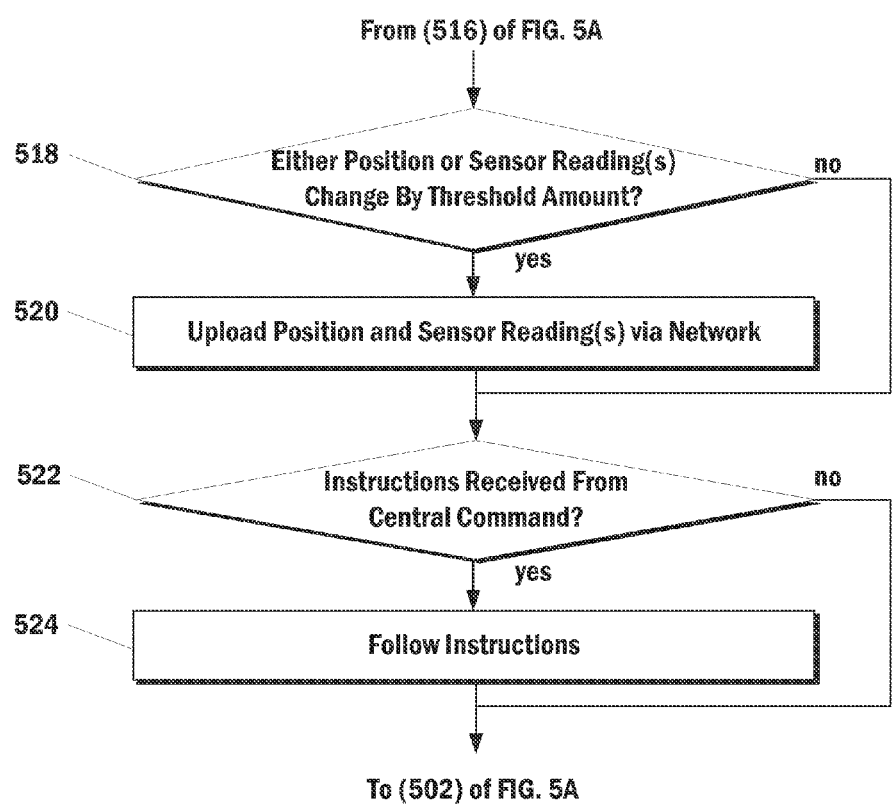

FIGS. 5A and 5B depict an exemplary method (500) for operating a remote monitoring unit according to an exemplary embodiment of the present disclosure. Method (500) can be implemented using any suitable remote monitoring unit, including, for example, remote monitoring unit 200 of FIG. 2. In addition, FIGS. 5A and 5B depict steps performed in a particular order for purposes of illustration and discussion. Those of ordinary skill in the art, using the disclosures provided herein, will understand that the various steps of method (500) can be omitted, adapted, and/or rearranged in various ways without departing from the scope of the present disclosure.

Referring now to FIG. 5A, at (502) GPS satellite signals can be received. For example, a positioning system that includes a GPS satellite receiver can receive the GPS signals at (502).

At (504) it can be determined whether the GPS signals are of acceptable strength. If it is determined at (504) that the GPS signals are of acceptable strength, then method (500) can proceed to (506) and determine a current position based on the GPS signals received at (502). For example, any known GPS geo-location technique can be used at (506). After determining the current position at (506), method (500) can proceed to (512).

However, returning to (504), if it is determined that the GPS signals are not of acceptable strength or are otherwise determined to be erroneous or undesirable, then method (500) can proceed to (508).

At (508) signals can be received from satellites included in the Iridium satellite constellation. At (510) the current position of the remote monitoring unit can be determined based on the signals received at (508).

At (512) one or more sensor readings can be obtained. For example, the remote monitoring unit can include or be in communication with one or more sensors, including, for example, a radiation sensor or gas leak sensor.

At (514) it can be determined whether the sensor readings obtained at (512) trigger a local alarm. As an example, the sensor readings can be compared to one or more threshold values stored in memory. As another example, a change in the sensor reading versus a previous reading can be determined and the change can be compared to one or more threshold values.

If it is determined at (514) that the sensor readings obtained at (512) trigger a local alarm or otherwise satisfy a local alarm condition, then at (516) the remote monitoring unit can provide a local alarm. For example, the local alarm can provide visual instructions on a screen. As another example, the local alarm can make a noise or flash a light to warn of the current or future existence of a hazardous condition. Thus, for example, personnel inspecting or working in an area exhibiting high radioactivity can be alerted to any increase in radiation or change in wind direction. The local alarm conditions can be stored in memory or provided by a central command via a bidirectional communications network. After (516), method (500) proceeds to (518) of FIG. 5B.

However, returning to (514), if it is determined at (514) that the sensor readings obtained at (512) do not trigger a local alarm, then method (500) bypasses (516) and proceeds directly to (518) of FIG. 5B.

Referring now to FIG. 5B, at (518) it can be determined whether either of the current position of the remote monitoring unit or the sensor readings has changed by greater than respective threshold amounts versus a previous reading (e.g. the penultimate reading). If it is determined at (518) that either or both of the position of the remote monitoring unit or the sensor readings obtained at (512) changed by greater than the respective threshold amounts, then method (500) can proceed to (520). The threshold amounts can be stored locally in memory or can be updated periodically by the central command.

At (520) the current position and the sensor readings can be uploaded by the remote monitoring unit to a central command via a wireless backhaul network. Other information can optionally be provided as well, including, for example, battery life. After uploading the information at (520), method (500) can proceed to (522).

However, returning to (518), if it is determined at (518) that neither the position of the remote monitoring unit nor the sensor readings have changed by greater than the respective threshold amounts, then method (500) can bypass (520) and proceed directly to (522). In such fashion, the remote monitoring unit only provides updates to the central command when significant changes have occurred, thereby conserving battery life.

At (522) it is determined whether instructions have been received from central command. If instructions have been received, then at (524) the instructions can be followed. As an example, instructions can include instructions to provide or sound an alarm, activate or deactivate various sensors or other components, update operating parameters or other software, change communications formats, or other suitable instructions. For example, the instructions can instruct the remote monitoring unit to switch to a beacon mode in which the remote monitoring unit continuously broadcasts its position.

As another example, the received instructions can indicate a proximity of the remote monitoring unit to a hazardous condition or otherwise indicate the location of the hazardous condition. Following such instructions at (524) can include providing a continuous, variable beeping sound to indicate whether the user is moving closer to or farther away from the location of the hazardous condition, thereby guiding the user away from the hazard. After following the instructions at (524), method (500) can return to (502) of FIG. 5A.

Returning to (522), if it is determined at (522) that instructions have not been received from central command, then method (500) can return directly to (502) of FIG. 5A.

Figure 6:
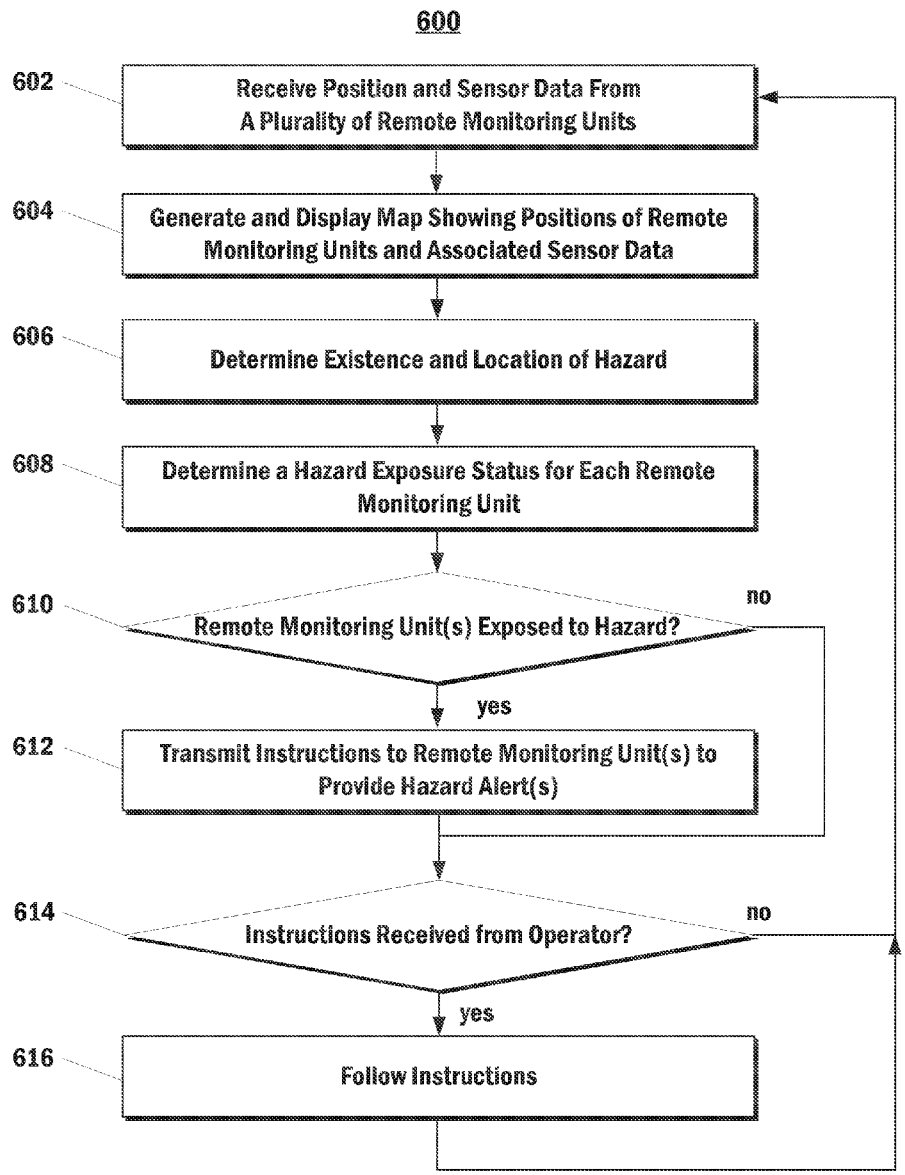
FIG. 6 depicts an exemplary method for operating a central command according to an exemplary embodiment of the present disclosure.

FIG. 6 depicts an exemplary method (600) for operating a central command according to an exemplary embodiment of the present disclosure. Method (600) can be implemented using any suitable central command, including, for example, central command 400 of FIG. 4. In addition, FIG. 6 depicts steps performed in a particular order for purposes of illustration and discussion. Those of ordinary skill in the art, using the disclosures provided herein, will understand that the various steps of method (500) can be omitted, adapted, and/or rearranged in various ways without departing from the scope of the present disclosure.

At (602) position and sensor data can be received from a plurality of remote monitoring units. For example, the position and sensor data can be communicated to the central command via a wireless backhaul network.

At (604) a map can be generated and displayed that shows the positions of the remote monitoring units and their associated sensor data. For example, a mapping module can be implemented to generate and display a map on a display of the central command. In such fashion, an operator of the central command can be given a graphical depiction of the position and status of each remote monitoring unit.

At (606) the existence and location of a hazardous condition can be determined. As an example, in one implementation, a hazard detection and alert module can be implemented to determine the existence and location of the hazardous condition. For example, the hazard detection and alert module can synthesize the sensor data, the position data, and any other knowledge to identify the presence and location of the hazard.

As another example, determining the existence and location of the hazardous condition at (606) can include receiving input from an operator of the central command. For example, the operator can use human knowledge to process and interpret the map provided at (604) to determine the existence and location of the hazardous condition. The operator can indicate such existence and location via input to the central command.

As yet another example, determining the existence and location of the hazardous condition at (606) can include receiving or retrieving information from an additional data source other than the remote monitoring units. For example, a school or other public location such as a courthouse or shopping center can have perimeter sensors that detect the acoustic sound of a gun being fired. The perimeter sensors can communicate the existence and location of the hazard to the central command at (606). As another example, at (606) the central command can receive or analyze weather data from an external data source to identify approaching storms or other hazardous conditions. Other external data sources can be monitored as well, including, for example, news sources or other Internet data.

At (608) a hazard exposure status can be determined for each remote monitoring unit. For example, at (608) the position of each remote monitoring unit can be compared to the location of the hazard to determine a proximity for each remote monitoring unit. Projected hazard statuses can be determined as well. Likewise, other parameters other than proximity can be analyzed, including, for example, personnel protections such as protective clothing, building layouts, or existing emergency response plans.

At (610) it can be determined whether any of the remote monitoring units are exposed to the hazardous condition. For example, the hazard exposure status for each remote monitoring unit can be analyzed at (610) to identify those remote monitoring that are at a significant risk of exposure to the hazardous condition.

If it is determined at (610) that at least one remote monitoring unit is subject to a significant exposure risk, then method (600) can proceed to (612) and transmit instructions to the appropriate remote monitoring units to provide hazard alerts to their respective users. For example, instructions can be provided to each of the remote monitoring units identified at (610). The instructions transmitted at (612) can provide text or audio for the remote monitoring unit to provide to the user, can indicate a proximity of the remote monitoring unit to the location of the hazard, can indicate the location of the hazard, can indicate a risk level, or can include other suitable information.

As another example, the instructions transmitted at (612) can instruct the remote monitoring unit to switch to a beacon mode in which the remote monitoring unit continuously broadcasts its position. Through the use of such beacon mode, the location of the remote monitoring unit can quickly be determined, speeding recovery efforts for an individual trapped under debris or rubble or hiding from a dangerous situation. After transmitting the instructions at (612), method (600) can proceed to (614).

However, returning to (610), if it is determined at (610) that no remote monitoring units are exposed to the hazardous condition, then method (600) can bypass (612) and proceed directly to (614).

At (614) it can be determined whether instructions have been received from the operator. If instructions have been received, then at (616) the instructions can be followed. For example, received instructions can include changes to various parameters, groupings of remote monitoring units, manually initiated alerts, or any other customizable or adjustable features of the present disclosure. After following the instructions at (616), method (600) can return to (602).

Returning to (614), if it is determined at (614) that instructions have not been received from the operator, then method (600) can return directly to (602).

Figure 7:
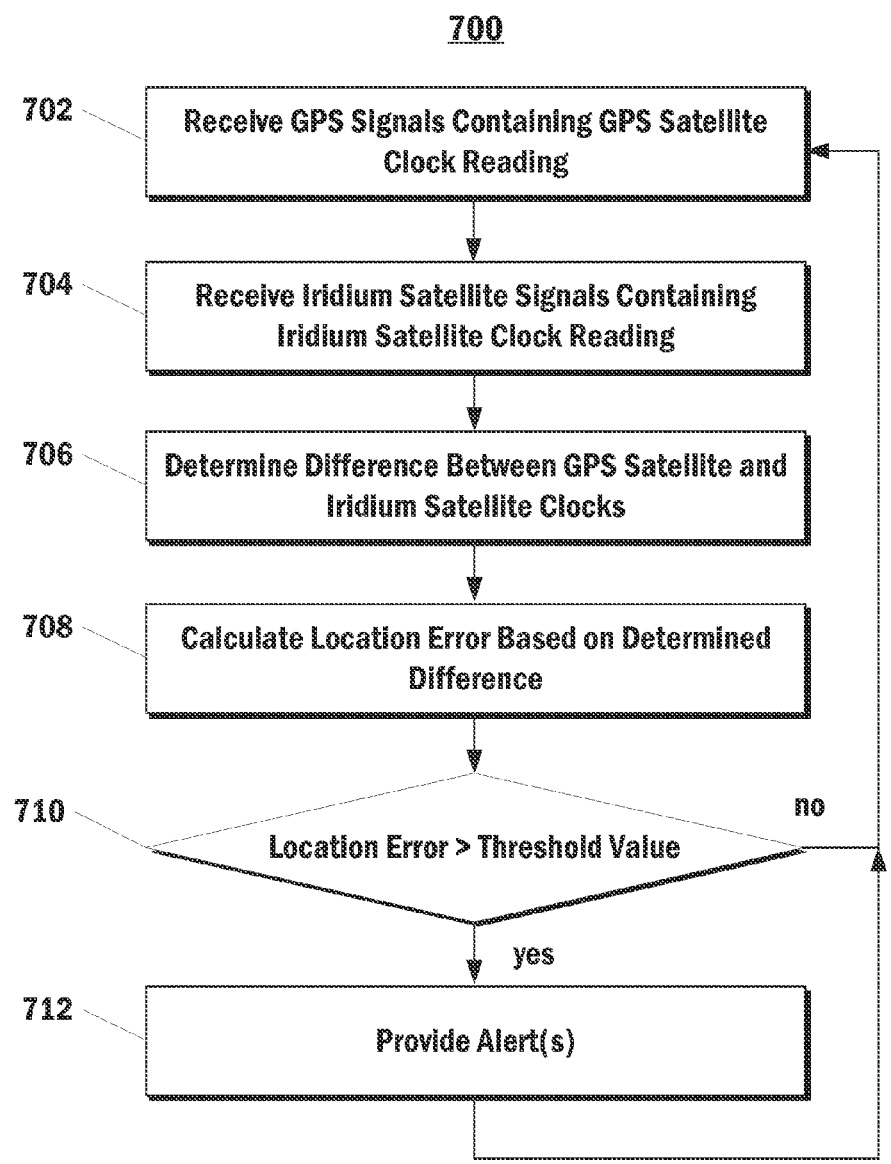
FIG. 7 depicts an exemplary method for operating a remote monitoring unit according to an exemplary embodiment of the present disclosure.

FIG. 7 depicts an exemplary method (700) for operating a remote monitoring unit according to an exemplary embodiment of the present disclosure. Method (700) can be implemented using any suitable remote monitoring unit, including, for example, remote monitoring unit 200 of FIG. 2.

In addition, FIG. 7 depicts steps performed in a particular order for purposes of illustration and discussion. Those of ordinary skill in the art, using the disclosures provided herein, will understand that the various steps of method (700) can be omitted, adapted, and/or rearranged in various ways without departing from the scope of the present disclosure.

At (702) GPS signals containing a current reading of the clock of the transmitting satellite(s) can be received. In particular, as is understood in the art, each signal transmitted by a GPS satellite can include the time of transmission as defined by an internal clock of the transmitting satellite. When a plurality of signals are respectively received from a plurality of GPS satellites, a current time according to the GPS satellite system clocks can be calculated.

The accuracy of a GPS satellite clock is approximately 10 nanoseconds. When multiplied by the speed of light (e.g. about 300,000,000 meters per second) such accuracy deviation translates to a distance error or uncertainty of about 3 meters.

At (704) signals can be received from Iridium® satellites that contain a current reading of the clock of the transmitting satellites. In particular, as is understood in the art, each signal transmitted by a satellite included in the Iridium® satellite constellation can include the time of transmission as defined by an internal clock of the transmitting satellite. When a plurality of signals are respectively received from a plurality of Iridium® satellites, a current time according to the Iridium® satellite system clocks can be calculated. It will be appreciated that (704) can be performed simultaneously with (702).

The accuracy of an Iridium® satellite clock is approximately 200 nanoseconds, which can translate to a distance error or uncertainty of about 60 meters.

At (706) a difference between the current time according to the GPS satellite system clock and the current time according to the Iridium® satellite system clock can be determined.

At (708) a location error can be calculated based on the difference determined at (706). For example, the difference can be multiplied by the speed of light to obtain the location error.

At (710) it can be determined whether the location error is greater than a threshold value. As an example, the threshold value can equal the root sum square of the general distance uncertainties respectively associated with the GPS satellite system and the Iridium® satellite system. Such root sum square can be about 60.1 meters. However, other threshold values can be used as well.

If it is determined at (710) that the location error is not greater than the threshold value, the method (700) can return to (702) and begin again. However, if it is determined at (710) that the location error is greater than the threshold value, then method (700) can proceed to (712) and provide one or more alerts. For example, the remote monitoring unit can provide an alert to a user that is wearing the remote monitoring unit. As another example, the remote monitoring unit can upload an alert indication to the central command and the central command can take appropriate actions. After (712), method (700) can return to (702) and begin again.

In such fashion, an additional safeguard against a location spoofing attack can be performed by the systems of the present disclosure. In particular, as the clocks associated with the GPS satellite system and the Iridium® satellite system are highly accurate in nature, a spoofing attack will likely be unable to consistently spoof the current time with such accuracy as to evade detection.

Furthermore, it will be appreciated that method (700) is exemplary in nature and that various modifications can be made to the particular steps provided without departing from the scope of the present disclosure. As an example, instead of calculating a location error based on the determined difference between the GPS satellite system clock and the Iridium® satellite system clock, the clock difference can itself be compared to a threshold time difference to determine whether to provide an alarm or alert. As another example, instead of performing the processing and calculations included in method (700) locally at the remote monitoring unit, method (700) can be modified so that received satellite signal data is uploaded to the central command and the central command can perform the processing and calculations included in method (700).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A remote monitoring unit for use in a hazard detection and alert system, the remote monitoring unit comprising:
    a communications module configured for bidirectional communication with a central command via a wireless backhaul network; and
    a positioning system configured to determine a position of the remote monitoring unit based on one or more signals received from one or more satellites located in Low Earth Orbit.

2. The remote monitoring unit of claim 1, wherein the one or more satellites located in Low Earth Orbit comprise one or more satellites included in the Iridium satellite constellation.

3. The remote monitoring unit of claim 1, further comprising a sensor, wherein the remote monitoring unit communicates an output of the sensor to the central command via the wireless backhaul network.

4. The remote monitoring unit of claim 3, wherein the remote monitoring unit is configured to communicate the output of the sensor to the central command via the wireless backhaul network only when the output of the sensor changes by more than a threshold percentage.

5. The remote monitoring unit of claim 3, wherein the sensor comprises a radiation detector.

6. The remote monitoring unit of claim 3, wherein the sensor comprises one of a chlorine detector or a hydrogen sulfide detector.

7. The remote monitoring unit of claim 1, further comprising:
    a rechargeable battery; and
    a betavoltaic battery configured to provide a trickle charge to the rechargeable battery.

8. The remote monitoring unit of claim 1, further comprising a human machine interface configured to provide an alert to a user, wherein the human machine interface comprises one of a display, a speaker, or a light emitting device, and wherein the human machine interface is configured to provide the alert to the user based on an output provided by the sensor or based on a command received from the central command.

9. The remote monitoring unit of claim 1, wherein the remote monitoring unit is configured to perform operations, the operations comprising:
    determining, based on the one or more signals received from the one or more satellites located in Low Earth Orbit, a first current time;
    determining, based on one or more signals received from one or more GPS satellites, a second current time;
    determining a time difference between the first current time and the second current time; and determining whether to provide an alarm based at least in part on the time difference.

10. The remote monitoring unit of claim 1, wherein the remote monitoring unit is portable and configured to be worn by a user.

11. The remote monitoring unit of claim 1, wherein:
the wireless backhaul network comprises an access point; and
the remote monitoring unit is configured to communicate with the access point independent of cellular telecommunication networks and the Internet.

12. A hazard detection and alert system comprising:
a central command;
a wireless backhaul network; and
a remote monitoring unit comprising:
    a communications module configured for bidirectional communication with the central command via the wireless backhaul network; and
    a positioning system;
wherein the wireless backhaul network provides at least a portion of the bidirectional communication capability independent of cellular telecommunication networks and the Internet.

13. The hazard detection and alert system of claim 12, wherein the positioning system is configured to determine a position of the remote monitoring unit based on one or more signals received from one or more satellites located in Low Earth Orbit.

14. The hazard detection and alert system of claim 13, wherein:
each of the one or more signals received from the one or more satellites located in Low Earth Orbit comprises a unique random number;
the remote monitoring unit is configured to provide the unique random number to the central command; and
the central command is configured to validate the unique random number received from the remote monitoring unit by comparing it to a second number received by a device of the hazard detection and alert system from the one or more satellites located in Low Earth Orbit, wherein the device is believed to be within a threshold distance from the remote monitoring unit.

15. The hazard detection and alert system of claim 12, wherein the wireless backhaul network comprises a plurality of access points respectively configured to communicate with a plurality of remote monitoring units.

16. The hazard detection and alert system of claim 12, wherein the wireless backhaul network comprises:
an access point configured for bidirectional communication with the remote monitoring unit; and
a satellite communications module configured to upload to the central command via a satellite link information received by the access point from the remote monitoring unit, wherein the satellite link comprises on or more satellites located in Low Earth Orbit.

17. The hazard detection and alert system of claim 12, wherein the wireless backhaul network provides all of the bidirectional communication capability independent of cellular telecommunication networks and the Internet.

18. A method for operating a hazard detection and alert system, the method comprising:
receiving, via a wireless backhaul network, sensor data from a plurality of remote monitoring units;
receiving, via the wireless backhaul network, positioning data describing a plurality of positions respectively associated with the plurality of remote monitoring units;
determining the existence and location of a hazard; and
instructing at least one of the plurality of remote monitoring units to provide an alert based at least in part on the location of the hazard and the plurality of positions;
wherein the alert indicates a proximity between the location of the hazard and the position of the remote monitoring unit providing the alert.

19. The method of claim 18, wherein the alert indicates the proximity by adjusting a frequency of an alert noise.

20. The method of claim 18, further comprising instructing at least one of the plurality of remote monitoring units to switch to a beacon mode in which the remote monitoring unit continuously broadcasts its position.

* * * * *

UNITED STATES PATENT AND TRADEMARK OFFICE
CERTIFICATE OF CORRECTION

PATENT NO. : 9,019,096 B2  
APPLICATION NO. : 14/037949  
DATED : April 28, 2015  
INVENTOR(S) : Joseph V. Cordaro et al.

Page 1 of 1

It is certified that error appears in the above-identified patent and that said Letters Patent is hereby corrected as shown below:

In the claims;

In Column 16, Claim 16, Line 14 "on" should be "one"

Signed and Sealed this
Twenty-sixth Day of January, 2016

Michelle K. Lee
*Director of the United States Patent and Trademark Office*